US012038157B1

(12) United States Patent
Hu

(10) Patent No.: US 12,038,157 B1
(45) Date of Patent: Jul. 16, 2024

(54) FOLDING PENDANT LAMP

(71) Applicant: Shouhong Hu, Hunan Province (CN)

(72) Inventor: Shouhong Hu, Hunan Province (CN)

( * ) Notice: Subject to any disclaimer, the term of this patent is extended or adjusted under 35 U.S.C. 154(b) by 0 days.

(21) Appl. No.: 18/514,217

(22) Filed: Nov. 20, 2023

(30) Foreign Application Priority Data

Oct. 30, 2023 (CN) ........................ 202322919998.2

(51) Int. Cl.
*F21V 19/02* (2006.01)
*F21S 8/06* (2006.01)
*F21V 21/26* (2006.01)

(52) U.S. Cl.
CPC .............. *F21V 19/02* (2013.01); *F21S 8/061* (2013.01); *F21V 21/26* (2013.01)

(58) Field of Classification Search
CPC .......... F21V 19/02; F21V 2/14; F21V 21/108; F21V 21/26; F21S 8/061
USPC ................................ 362/285, 287, 418, 427
See application file for complete search history.

(56) References Cited

U.S. PATENT DOCUMENTS 1,012,234 A * 12/1911 Beardslee .............. F16M 13/00 362/406
3,831,022 A * 8/1974 Porter ..................... F21S 8/065 362/406
4,748,549 A * 5/1988 Scheer .................... F21S 8/065 362/406
7,086,762 B2 * 8/2006 Nicholas ................. F21S 8/065 362/427
8,794,796 B2 * 8/2014 Lee .................... H01R 13/7175 362/249.02
2005/0099810 A1 * 5/2005 Tasson .................... F21S 43/15 362/249.07

FOREIGN PATENT DOCUMENTS

WO WO-9749949 A1 * 12/1997 .............. F21S 8/065

* cited by examiner

*Primary Examiner* — Laura K Tso

(57) ABSTRACT

The present disclosure provides a folding pendant lamp. The folding pendant lamp includes a pendant lamp main body and a pendant lamp group. One end of the pedant lamp group connected to the pendant lamp main body is provided with a rotating shaft. The pendant lamp group rotates around the rotating shaft serving as an axis, so that the pendant lamp group rotates to a folded position. At this time, the folding pendant lamp occupies the smallest area and is convenient for storage, packaging, and transportation.

18 Claims, 13 Drawing Sheets

FOLDING PENDANT LAMP

CROSS-REFERENCE TO RELATED APPLICATIONS

The application claims priority of Chinese patent application CN2023229199982, filed on Oct. 30, 2023, which is incorporated herein by reference in its entireties.

TECHNICAL FIELD

The present disclosure relates to the field of lamps, and in particular, to a folding pendant lamp.

BACKGROUND

At present, most pendant lamps on the market are fixed, which occupy a large space during transportation and are difficult to package. Therefore, there is an urgent need for a folding pendant lamp that can be folded and stored on the market. Folding placement during transportation saves space, saves transportation fees, and better protects the pendant lamp during the transportation.

SUMMARY

In order to overcome the shortcomings of the prior art, the present disclosure provides a folding pendant lamp, including a pendant lamp main body and a lamp body group. The lamp body group is rotatably connected to the pendant lamp main body, so that the lamp body group rotates between an unfolded position and a folded position along the pendant lamp main body.

As the improvement of the present disclosure, the lamp body group rotates between the unfolded position and the folded position along a central axis of the pendant lamp main body.

As the improvement of the present disclosure, the pendant lamp main body is spherical cap-shaped, and the spherical cap-shaped pendant lamp main body includes an arc-shaped upper surface and a flat lower surface.

As the improvement of the present disclosure, the lamp body group includes several first lamp bodies and several second lamp bodies; the pendant lamp main body is provided with several first connecting portions and several second connecting portions; the first lamp bodies are rotatably connected to the first connecting portions, and the second lamp bodies are rotatably connected to the second connecting portions; a horizontal distance between the first connecting portions and the central axis is a first distance; a horizontal distance between the second connecting portions and the central axis is a second distance; and the second distance is greater than the first distance.

As the improvement of the present disclosure, the lamp body group includes several fourth lamp bodies and several fifth lamp bodies; the pendant lamp main body is provided with several fourth connecting portions and several fifth connecting portions; the fourth lamp bodies are rotatably connected to the fourth connecting portions, and the fifth lamp bodies are rotatably connected to the fifth connecting portions; a horizontal distance between the fourth connecting portions and the central axis is a fourth distance; a horizontal distance between the fifth connecting portions and the central axis is a fifth distance; and the fifth distance is greater than the fourth distance.

As the improvement of the present disclosure, the lamp body group includes several third lamp bodies and several sixth lamp bodies; the pendant lamp main body is provided with several third connecting portions and several sixth connecting portions; the third lamp bodies are rotatably connected to the third connecting portions, and the sixth lamp bodies are rotatably connected to the sixth connecting portions; a horizontal distance between the third connecting portions and the central axis is a third distance; a horizontal distance between the sixth connecting portions and the central axis is a sixth distance; and the third distance is equal to the sixth distance.

As the improvement of the present disclosure, the first connecting portions and the second connecting portions are located in the same vertical plane; the fourth connecting portions and the fifth connecting portions are located in the same vertical plane; the first connecting portions and the fourth connecting portions are located in the same horizontal plane; and the second connecting portions and the fifth connecting portions are located in the same horizontal plane.

As the improvement of the present disclosure, the first lamp bodies and the second lamp bodies are located in the same vertical plane; the fourth lamp bodies and the fifth lamp bodies are located in the same vertical plane; the first lamp bodies and the fourth lamp bodies are located in the same horizontal plane; and the second lamp bodies and the fifth lamp bodies are located in the same horizontal plane.

As the improvement of the present disclosure, the pendant lamp main body is provided with several first rotating slots, second rotating slots, third rotating slots, fourth rotating slots, fifth rotating slots, and sixth rotating slots along the arc-shaped upper surface; the first connecting portions are arranged in the first rotating slots; the second connecting portions are arranged in the second rotating slots; the third connecting portions are arranged in the third rotating slots; the fourth connecting portions are arranged in the fourth rotating slots; the fifth connecting portions are arranged in the fifth rotating slots; the sixth connecting portions are arranged in the sixth rotating slots; the first rotating slots and the second rotating slots are located in the same vertical plane; the fourth rotating slots and the fifth rotating slots are located in the same vertical plane; the first rotating slots and the fourth rotating slots are located in the same horizontal plane; and the second rotating slots and the fifth rotating slots are located in the same horizontal plane.

As the improvement of the present disclosure, a first stop edge is arranged at a top end of each first rotating slot, and a second stop edge is arranged at a bottom end of the first rotating slot; a third stop edge is arranged at a top end of each second rotating slot, and a fourth stop edge is arranged at a bottom end of the second rotating slot; a fifth stop edge is arranged at a top end of each third rotating slot, and a sixth stop edge is arranged at a bottom end of the third rotating slot; a seventh stop edge is arranged at a top end of each fourth rotating slot, and an eighth stop edge is arranged at a bottom end of the fourth rotating slot; a ninth stop edge is arranged at a top end of each fifth rotating slot, and a tenth stop edge is arranged at a bottom end of the fifth rotating slot; and an eleventh stop edge is arranged at a top end of each sixth rotating slot, and a twelfth stop edge is arranged at a bottom end of the sixth rotating slot.

As the improvement of the present disclosure, the pendant lamp main body further includes a rotating shaft; the first lamp bodies are rotatably connected to the first connecting portions through the rotating shaft; the second lamp bodies are rotatably connected to the second connecting portions through the rotating shaft; the third lamp bodies are rotatably connected to the third connecting portions through the rotating shaft; the fourth lamp bodies are rotatably connected to the fourth connecting portions through the rotating shaft; the fifth lamp bodies are rotatably connected to the fifth connecting portions through the rotating shaft; and the sixth lamp bodies are rotatably connected to the sixth connecting portions through the rotating shaft.

As the improvement of the present disclosure, the first lamp bodies rotate around an axis of the rotating shaft; when the first lamp bodies rotate to the folded position, the first lamp bodies resist against the first stop edges; when the first lamp bodies rotate to the unfolded position, the first lamp bodies resist against the second stop edges; the second lamp bodies rotate around the axis of the rotating shaft; when the second lamp bodies rotate to the folded position, the second lamp bodies resist against the third stop edges; when the second lamp bodies rotate to the unfolded position, the second lamp bodies resist against the fourth stop edges; the third lamp bodies rotate around the axis of the rotating shaft; when the third lamp bodies rotate to the folded position, the third lamp bodies resist against the fifth stop edges; when the third lamp bodies rotate to the unfolded position, the third lamp bodies resist against the sixth stop edges; the fourth lamp bodies rotate around the axis of the rotating shaft; when the fourth lamp bodies rotate to the folded position, the fourth lamp bodies resist against the seventh stop edges; when the fourth lamp bodies rotate to the unfolded position, the fourth lamp bodies resist against the eighth stop edges; the fifth lamp bodies rotate around the axis of the rotating shaft; when the fifth lamp bodies rotate to the folded position, the fifth lamp bodies resist against the ninth stop edges; when the fifth lamp bodies rotate to the unfolded position, the fifth lamp bodies resist against the tenth stop edges; the sixth lamp bodies rotate around the axis of the rotating shaft; when the sixth lamp bodies rotate to the folded position, the sixth lamp bodies resist against the eleventh stop edges; and when the sixth lamp bodies rotate to the unfolded position, the sixth lamp bodies resist against the twelfth stop edges.

As the improvement of the present disclosure, the first rotating slots and the fourth rotating slots are uniformly distributed on an upper side part of the pendant lamp main body; the second rotating slots and the fifth rotating slots are uniformly distributed on a lower side part of the pendant lamp main body; and the third rotating slots and the sixth rotating slots are uniformly distributed in a middle part of the pendant lamp main body.

As the improvement of the present disclosure, the pendant lamp main body includes an upper housing and a lower housing; the upper housing is connected to the lower housing; a cross section of the upper housing is semicircular; a cross section of the lower housing is a quadrangle with a wide top and a narrow bottom; an upper side of the lower housing is connected to the upper housing; a flat lower surface is formed on a lower side of the lower housing; a battery box is arranged on the lower surface; a battery accommodating cavity is arranged in the battery box; and a power switch is arranged on the lower surface.

As the improvement of the present disclosure, each first lamp body includes a first lamp post and a lamp base; one end of the first lamp post is rotatably connected to the first connecting portion through the rotating shaft, and the other end of the first lamp post is connected to the lamp base; each second lamp body includes a second lamp post and a lamp base; one end of the second lamp post is rotatably connected to the second connecting portion through the rotating shaft, and the other end of the second lamp post is connected to the lamp base; each third lamp body includes a third lamp post and a lamp base; one end of the third lamp post is rotatably connected to the third connecting portion through the rotating shaft, and the other end of the third lamp post is connected to the lamp base; each fourth lamp body includes a fourth lamp post and a lamp base; one end of the fourth lamp post is rotatably connected to the fourth connecting portion through the rotating shaft, and the other end of the fourth lamp post is connected to the lamp base; each fifth lamp body includes a fifth lamp post and a lamp base; one end of the fifth lamp post is rotatably connected to the fifth connecting portion through the rotating shaft, and the other end of the fifth lamp post is connected to the lamp base; each sixth lamp body includes a sixth lamp post and a lamp base; one end of the sixth lamp post is rotatably connected to the sixth connecting portion through the rotating shaft, and the other end of the sixth lamp post is connected to the lamp base; the first lamp post, the third lamp post, and the fifth lamp post have same lengths; the second lamp post, the fourth lamp post, and the sixth lamp post have same lengths; and the lengths of the second lamp post, the fourth lamp post, and the sixth lamp post are different from the lengths of the first lamp post, the third lamp post, and the fifth lamp post.

As the improvement of the present disclosure, the first connecting portions, the second connecting portions, the third connecting portions, the fourth connecting portions, the fifth connecting portions, and the sixth connecting portions are all provided with first wiring holes; the rotating shaft is provided with a through hole; the first lamp posts, the second lamp post, the third lamp posts, the fourth lamp posts, the fifth lamp posts, and the sixth lamp posts are all provided with second wiring holes; and the first wiring holes are communicated with the second wiring holes through the through hole.

As the improvement of the present disclosure, a seventh connecting portion is arranged at a top of the pendant lamp main body; the pendant lamp main body further includes a hanging chain; the hanging chain is composed of several metal rings that are sequentially interlocked; and one end of the hanging chain is provided with a hook, and the other end of the hanging chain is connected to the seventh connecting portion.

As the improvement of the present disclosure, the upper housing is provided with a positioning bolt; the lower housing is provided with a positioning slot; and when the positioning bolt is inserted into the positioning slot, the upper housing is fixedly connected to the lower housing.

As the improvement of the present disclosure, a lower end of the rotating shaft is provided with a threaded hole; one end of each first lamp post connected to the rotating shaft is provided with a positioning hole; the first lamp post is detachably connected to the rotating shaft through a screw; one end of each second lamp post connected to the rotating shaft is provided with a positioning hole; the second lamp post is detachably connected to the rotating shaft through a screw; one end of each third lamp post connected to the rotating shaft is provided with a positioning hole; the third lamp post is detachably connected to the rotating shaft through a screw; one end of each fourth lamp post connected to the rotating shaft is provided with a positioning hole; the fourth lamp post is detachably connected to the rotating shaft through a screw; one end of each fifth lamp post connected to the rotating shaft is provided with a positioning hole; the fifth lamp post is detachably connected to the rotating shaft through a screw; one end of each sixth lamp post connected to the rotating shaft is provided with a positioning hole; and the sixth lamp post is detachably connected to the rotating shaft through a screw.

As the improvement of the present disclosure, each lamp base includes a filament holder and a luminous filament; a cross section of the filament holder is in a cross shape; and the luminous filament is arranged on the filament holder.

Beneficial effects of the present disclosure are as follows: The present disclosure provides a folding pendant lamp, including a pendant lamp main body and a pendant lamp group. One end of the pedant lamp group connected to the pendant lamp main body is provided with a rotating shaft. The pendant lamp group rotates around the rotating shaft serving as an axis, so that the pendant lamp group rotates to a folded position. At this time, the folding pendant lamp occupies the smallest area and is convenient for storage, packaging, and transportation.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
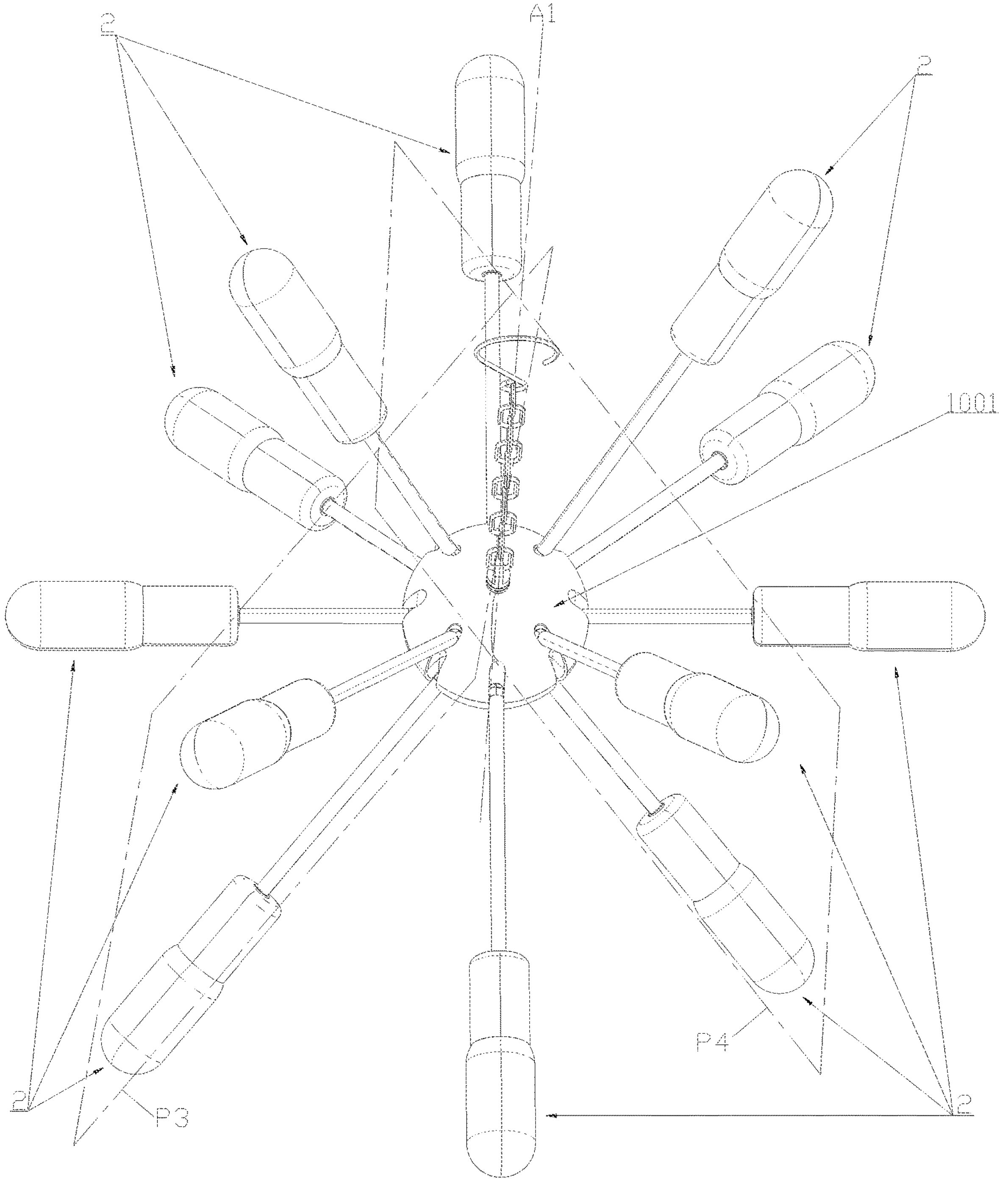
FIG. 1 is a schematic diagram of an entire structure of the present disclosure.
Figure 2:
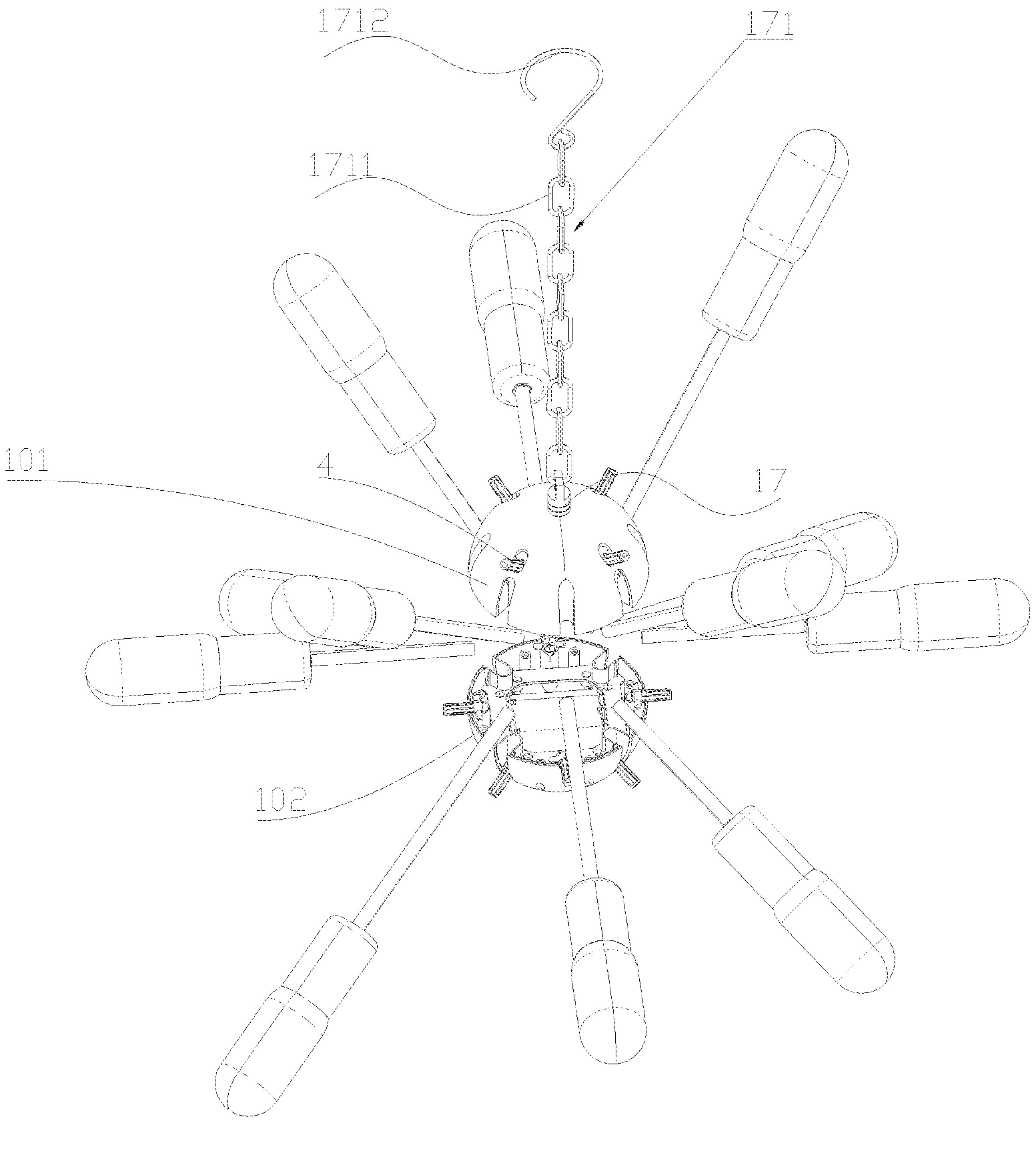
FIG. 2 is an exploded view of the present disclosure.
Figure 3:
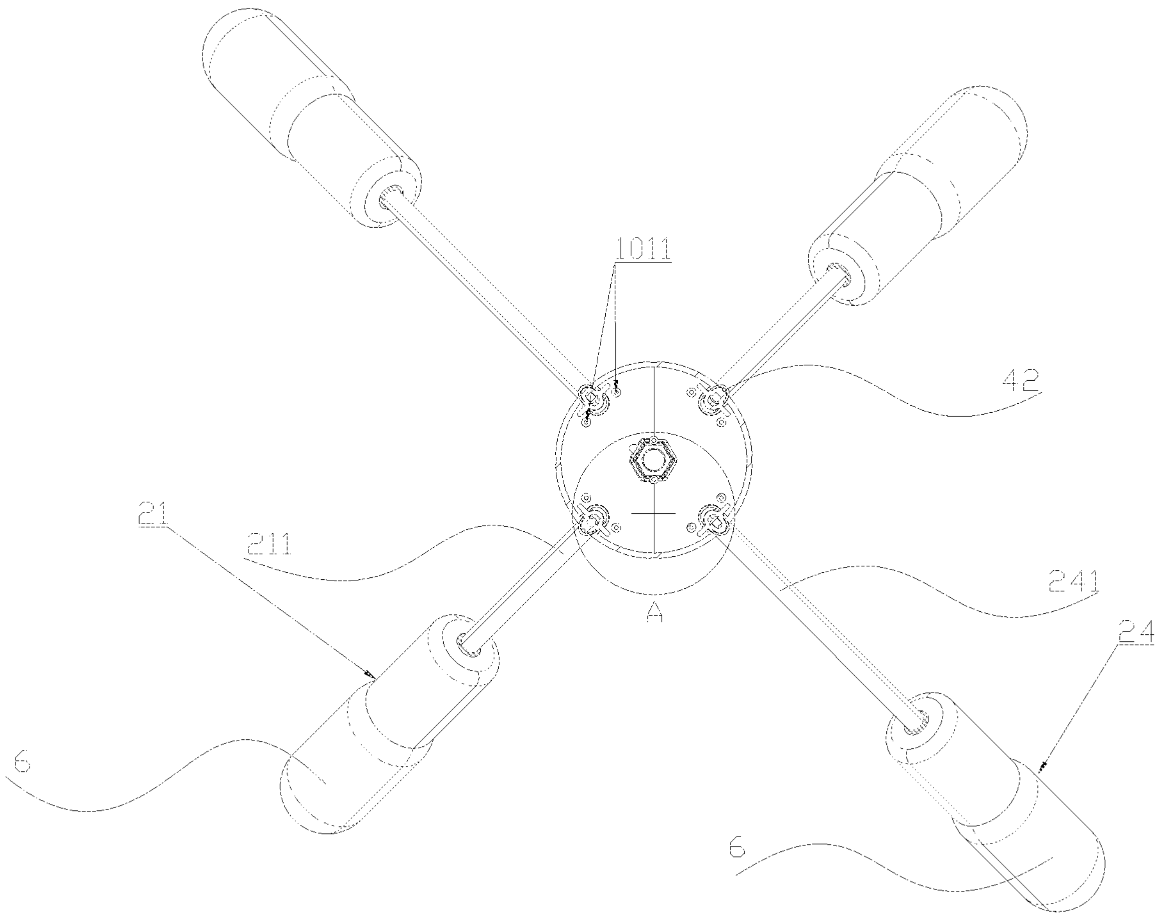
FIG. 3 is a sectional view of the present disclosure along first lamp posts and fourth lamp posts.
Figure 4:
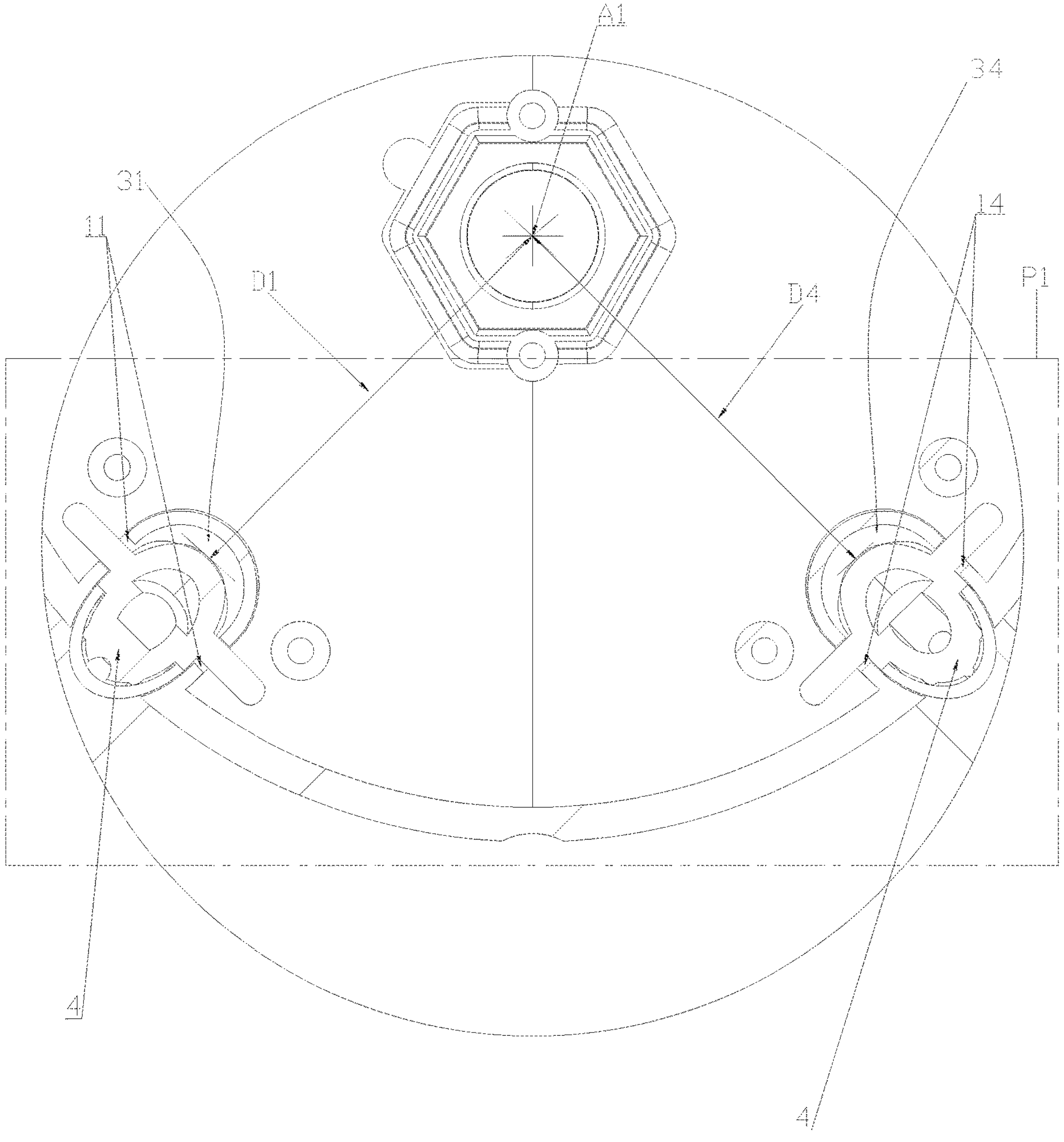
FIG. 4 is a partially enlarged view of the part A in FIG. 3.
Figure 5:
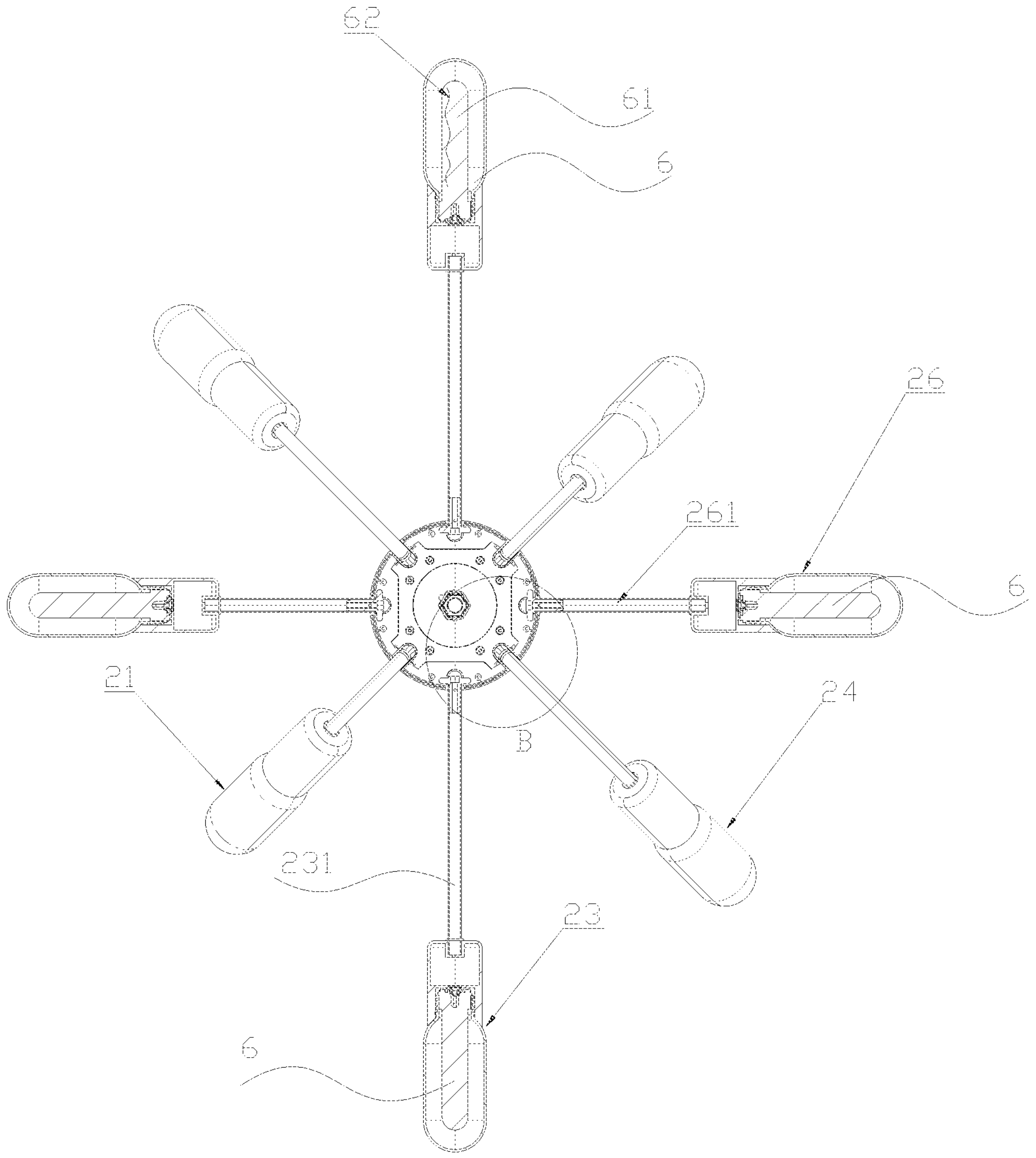
FIG. 5 is a sectional view along third lamp posts and sixth lamp posts according to the present disclosure.
Figure 6:
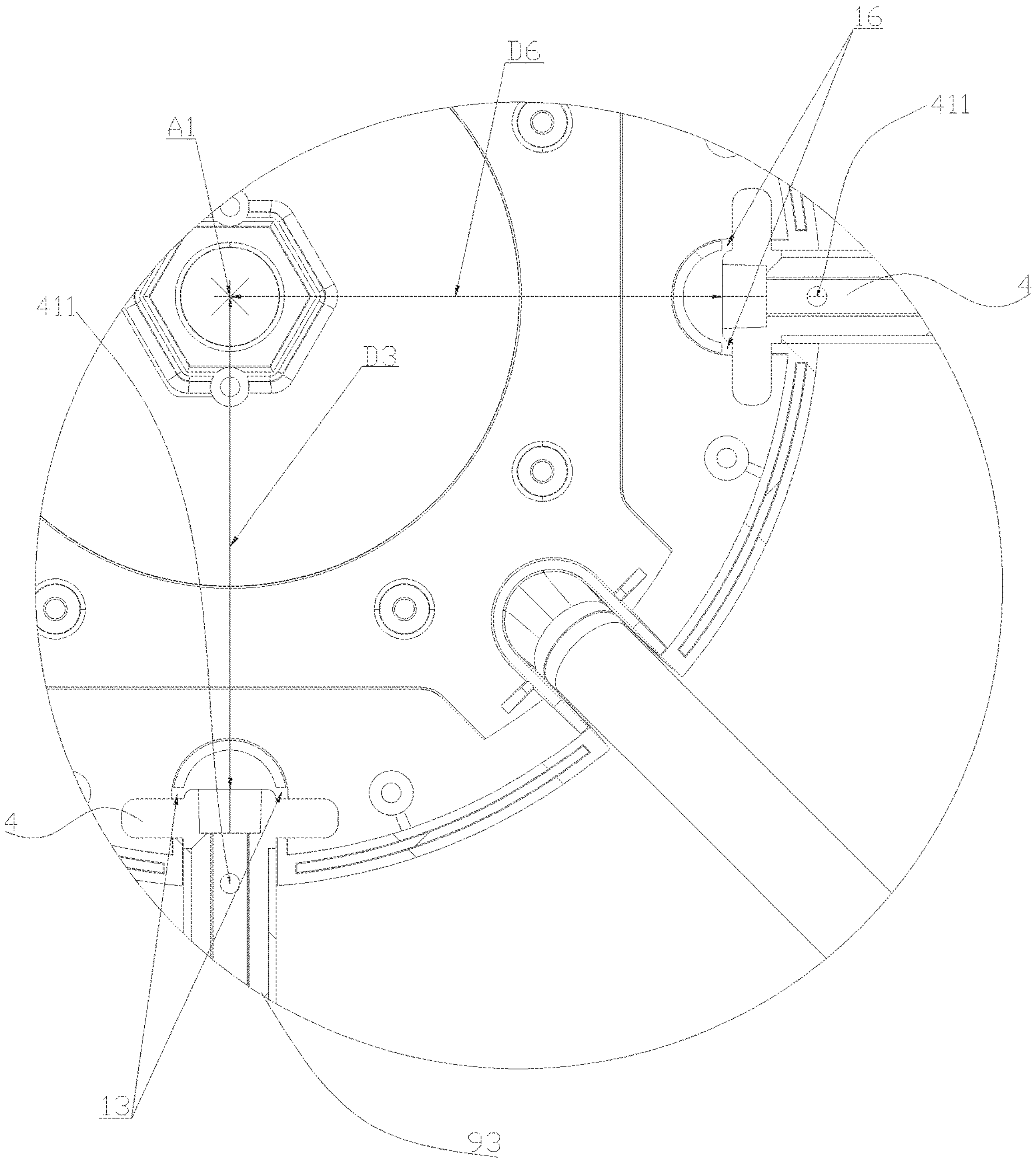
FIG. 6 is a partially enlarged view of the part B in FIG. 5.
Figure 7:
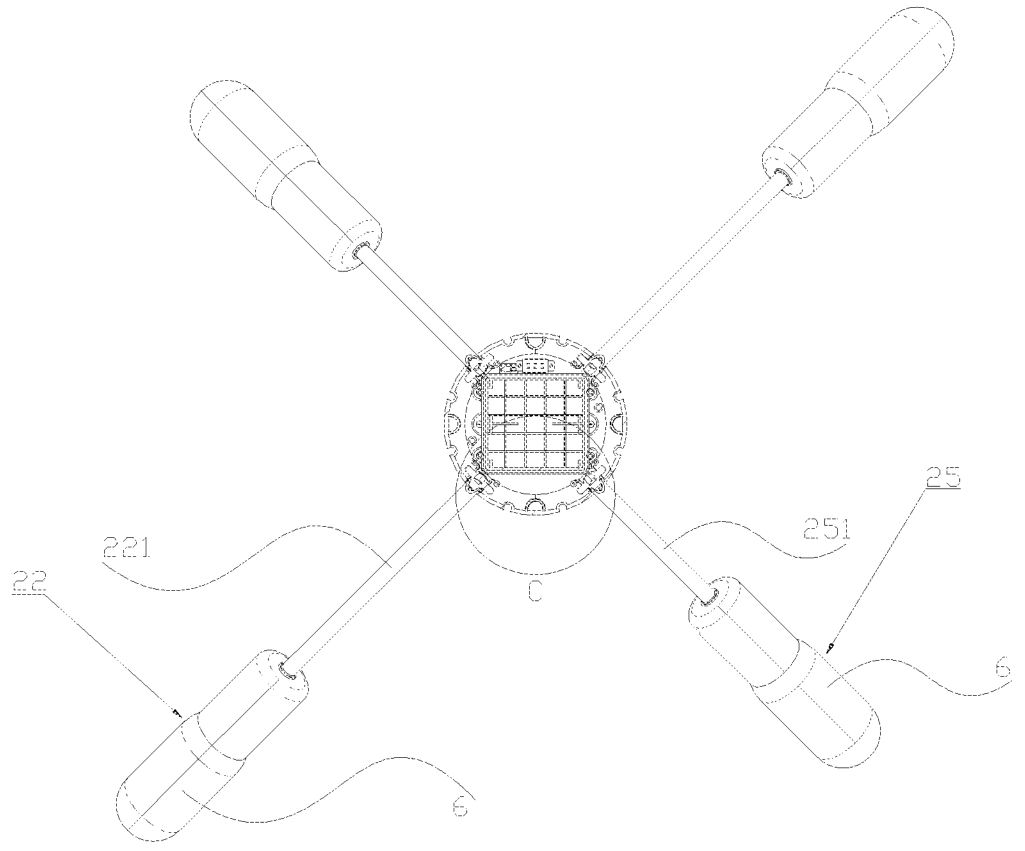
FIG. 7 is a sectional view along second lamp posts and fifth lamp posts according to the present disclosure.
Figure 8:
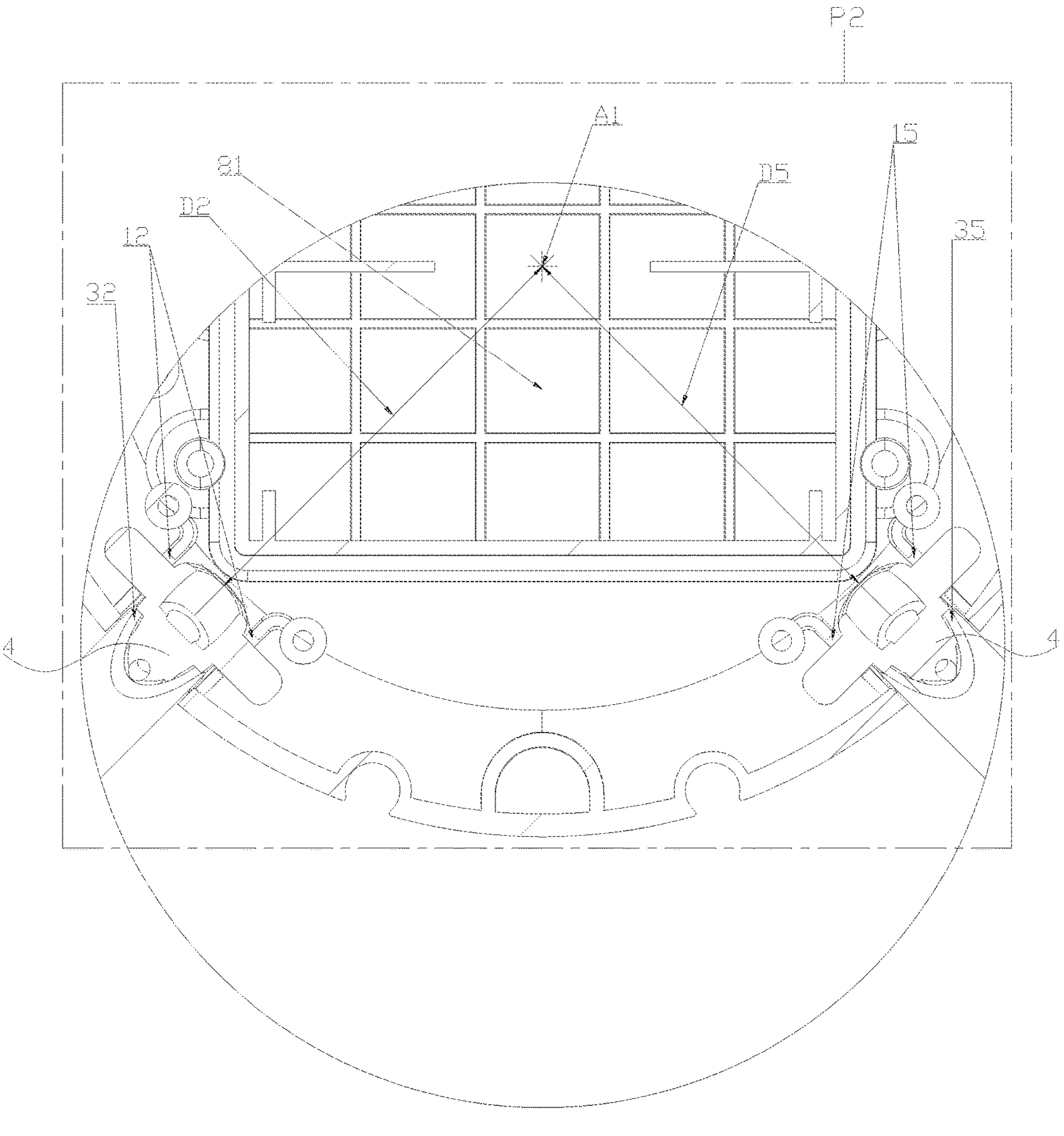
FIG. 8 is a partially enlarged view of the part C in FIG. 7.
Figure 9:
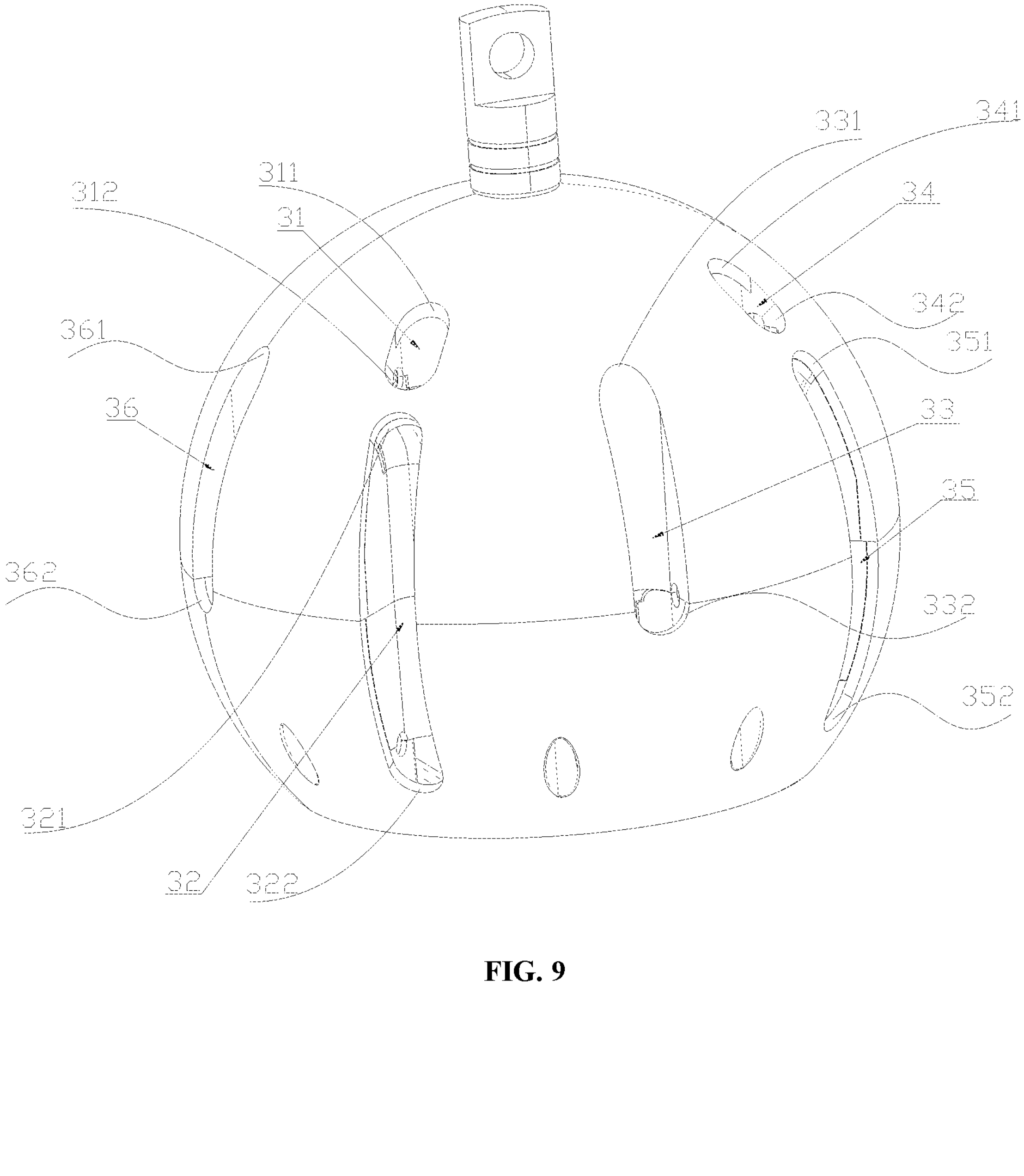
FIG. 9 is a schematic structural diagram of a pendant lamp main body of the present disclosure.
Figure 10:
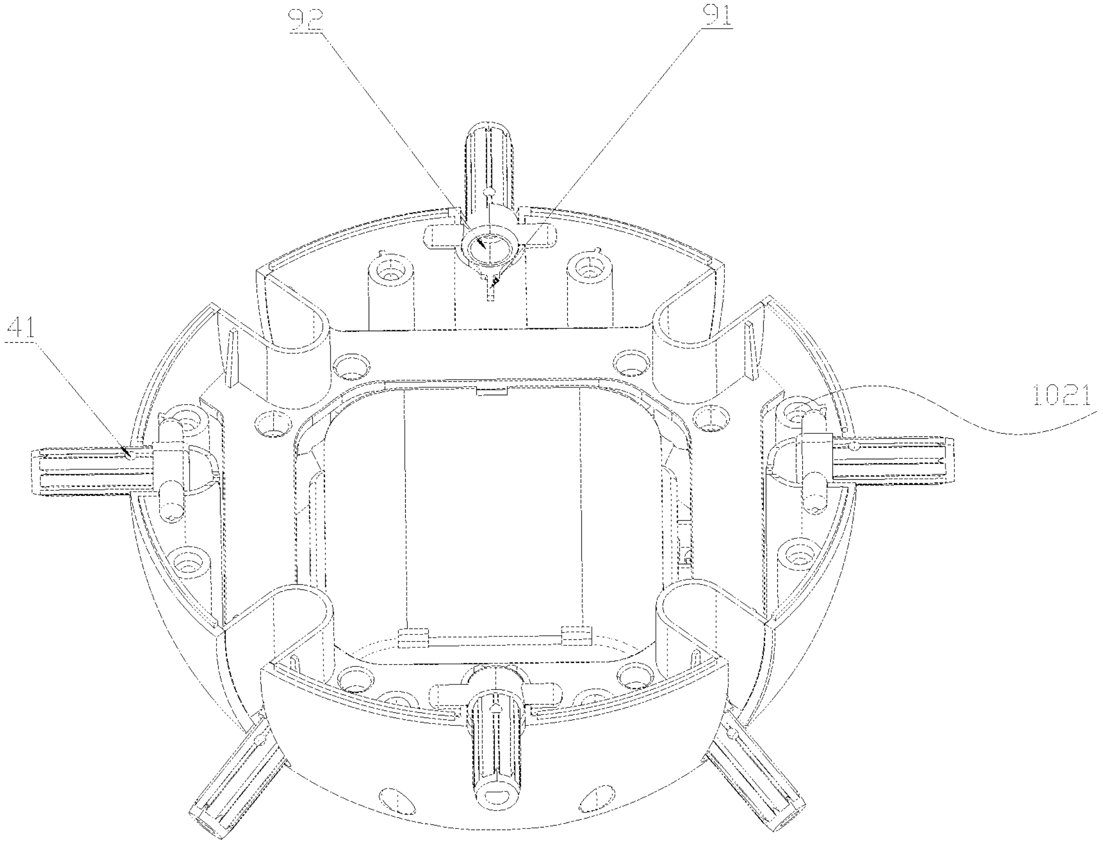
FIG. 10 is a schematic structural diagram of a lower housing of the present disclosure.
Figure 11:
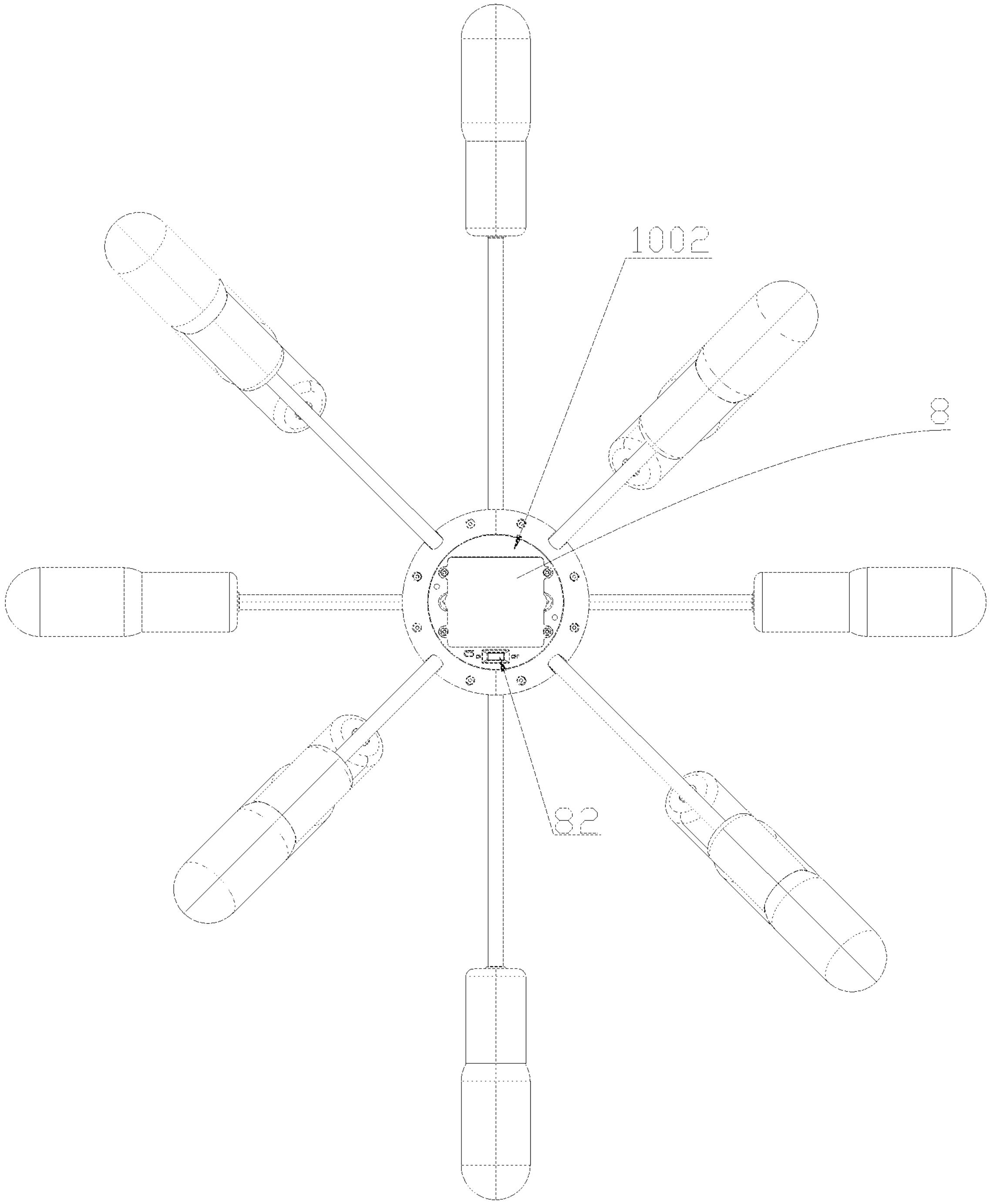
FIG. 11 is a bottom view of the present disclosure.
Figure 12:
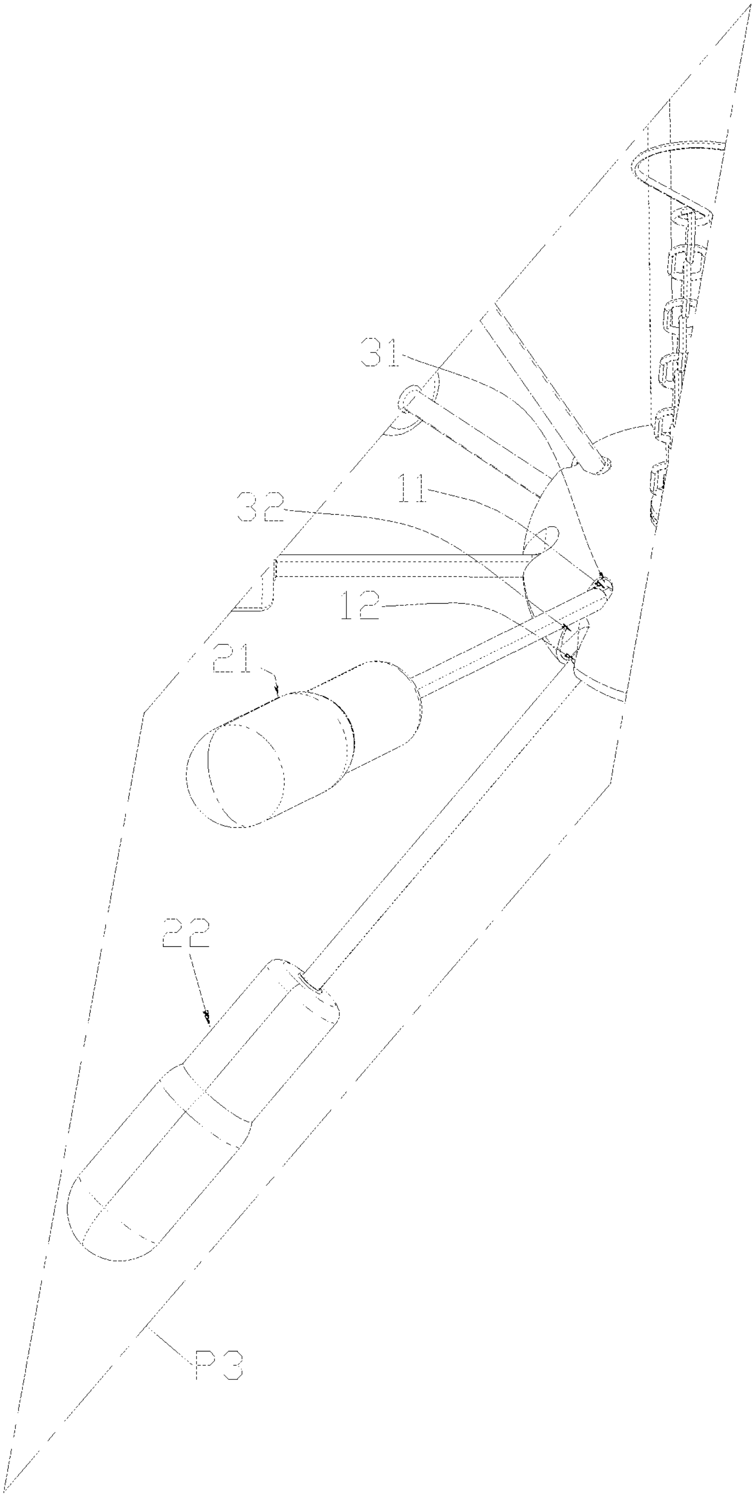
FIG.12 is a partly enlarge view of FIG. 1.
Figure 13:
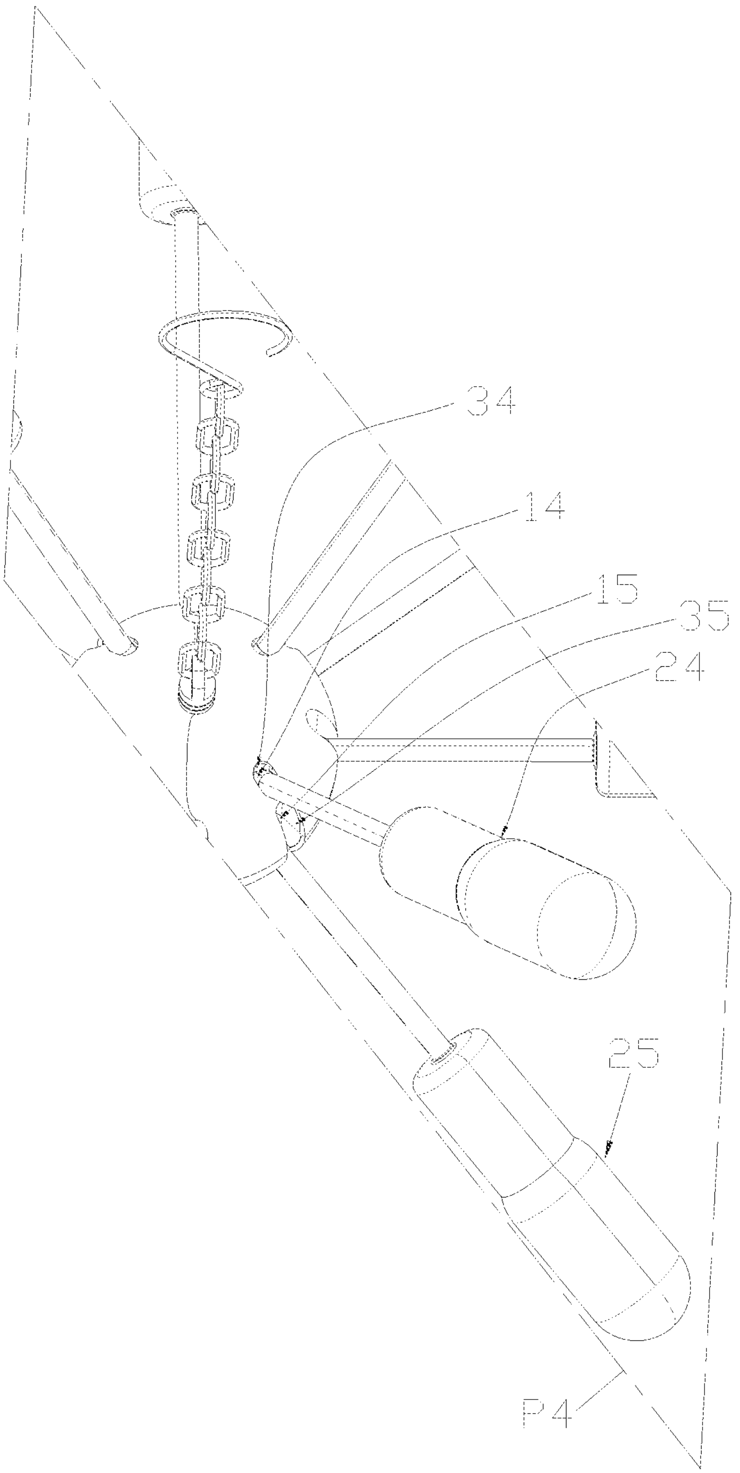
FIG. 13 is another partly enlarge view of FIG. 1.

Referring to FIG. 1 to FIG. 13, a folding pendant lamp includes:

a pendant lamp main body 1; and a lamp body group 2, wherein the lamp body group 2 is rotatably connected to the pendant lamp main body 1, so that the lamp body group 2 can rotate between an unfolded position and a folded position along the pendant lamp main body. Through the above structure, the lamp body group 2 rotates to the folded position, which is convenient for storage, packaging, and transportation.

In this embodiment, the lamp body group 2 can rotate between the unfolded position and the folded position along a central axis of the pendant lamp main body 1. Through the above structure, during use after the transportation of the folding pendant lamp is completed, the lamp body group 2 can be rotated to the unfolded position for daily use.

In this embodiment, the pendant lamp main body 1 is spherical cap-shaped, and the spherical cap-shaped pendant lamp main body 1 includes an arc-shaped upper surface 1001 and a flat lower surface 1002. Due to the flat lower surface 1002, the pendant lamp main body 1 can be placed smoothly on a flat surface such as a bottom surface of a table. The arc-shaped upper surface 1001 has a simple and beautiful design.

In this embodiment, the lamp body group 2 includes several first lamp bodies 21 and several second lamp bodies 22; the pendant lamp main body 1 is provided with several first connecting portions 11 and several second connecting portions 12; the first lamp bodies 21 are rotatably connected to the first connecting portions 11, and the second lamp bodies 22 are rotatably connected to the second connecting portions 12; a horizontal distance between the first connecting portions 11 and the central axis A1 is a first distance D1; a horizontal distance between the second connecting portions 12 and the central axis A1 is a second distance D2; and the second distance D2 is greater than the first distance D1. The horizontal distances from the first connecting portions 11 and the second connecting portions 12 to the central axis A1 are different, so that the first lamp bodies 21 and the second lamp bodies 22 do not affect each other when rotated to the folded position.

In this embodiment, the lamp body group 2 includes several fourth lamp bodies 24 and several fifth lamp bodies 25; the pendant lamp main body 1 is provided with several fourth connecting portions 14 and several fifth connecting portions 15; the fourth lamp bodies 24 are rotatably connected to the fourth connecting portions 14, and the fifth lamp bodies 25 are rotatably connected to the fifth connecting portions 15; a horizontal distance between the fourth connecting portions 14 and the central axis A1 is a fourth distance D4; a horizontal distance between the fifth connecting portions 15 and the central axis A1 is a fifth distance D5; and the fifth distance D5 is greater than the fourth distance D4. The horizontal distances from the fourth connecting portions 14 and the fifth connecting portions 15 to the central axis A1 are different, so that the fourth lamp bodies 24 and the fifth lamp bodies 25 do not affect each other when rotated to the folded position.

In this embodiment, the lamp body group 2 includes several third lamp bodies 23 and several sixth lamp bodies 26; the pendant lamp main body 1 is provided with several third connecting portions 13 and several sixth connecting portions 16; the third lamp bodies 23 are rotatably connected to the third connecting portions 13, and the sixth lamp bodies 26 are rotatably connected to the sixth connecting portions 16; a horizontal distance between the third connecting portions 13 and the central axis A1 is a third distance D3; a horizontal distance between the sixth connecting portions 16 and the central axis A1 is a sixth distance D6; and the third distance D3 is equal to the sixth distance D6. Horizontal heights of both the third lamp bodies 23 and the sixth lamp bodies 26 are different from horizontal heights of other lamp bodies. This design creates a sense of beauty by interlacing the various lamp bodies.

In this embodiment, the first connecting portions 11 and the second connecting portions 12 are located in the same vertical plane (P3); the fourth connecting portions 14 and the fifth connecting portions 15 are located in the same vertical plane (P4); the first connecting portions 11 and the fourth connecting portions 14 are located in the same horizontal plane (P1); and the second connecting portions 12 and the fifth connecting portions 15 are located in the same horizontal plane (P2). The first lamp bodies 21 and the second lamp bodies 22 are located in the same vertical plane (P3); the fourth lamp bodies 24 and the fifth lamp bodies 25 are located in the same vertical plane (P4); the first lamp bodies 21 and the fourth lamp bodies 24 are located in the same horizontal plane (P1); and the second lamp bodies 22 and the fifth lamp bodies 25 are located in the same horizontal plane (P1). Through the above structure, the lamp body group 2 is uniformly and symmetrically distributed on the pendant lamp main body 1, making it more aesthetically pleasing.

In this embodiment, the pendant lamp main body 1 is provided with several first rotating slots 31, second rotating slots 32, third rotating slots 33, fourth rotating slots 34, fifth rotating slots 35, and sixth rotating slots 36 along the arc-shaped upper surface 1001; the first connecting portions 11 are arranged in the first rotating slots 31; the second connecting portions 12 are arranged in the second rotating slots 32; the third connecting portions 13 are arranged in the third rotating slots 33; the fourth connecting portions 14 are arranged in the fourth rotating slots 34; the fifth connecting portions 15 are arranged in the fifth rotating slots 35; the sixth connecting portions 16 are arranged in the sixth rotating slots 36; the first rotating slots 31 and the second rotating slots 32 are located in the same vertical plane (P3); the fourth rotating slots 34 and the fifth rotating slots 35 are located in the same vertical plane (P4); the first rotating slots 31 and the fourth rotating slots 34 are located in the same horizontal plane (P1); and the second rotating slots 32 and the fifth rotating slots 35 are located in the same horizontal plane (P2). Through the above structure, the respective lamp bodies rotate in the respective rotating slots, so that the respective lamp bodies can only rotate in a limited direction. Moreover, since the upper surface 1001 is a curved surface, if no rotating slot is provided, the respective lamp bodies will be stuck by the surface of the pendant lamp main body 1 during rotation. By the arrangement of the rotating slots, the respective lamp bodies can rotate on the surface of the pendant lamp main body 1.

In this embodiment, a first stop edge 311 is arranged at a top end of each first rotating slot 31, and a second stop edge 312 is arranged at a bottom end of the first rotating slot 31; a third stop edge 321 is arranged at a top end of each second rotating slot 32, and a fourth stop edge 322 is arranged at a bottom end of the second rotating slot 32; a fifth stop edge 331 is arranged at a top end of each third rotating slot 33, and a sixth stop edge 332 is arranged at a bottom end of the third rotating slot 33; a seventh stop edge 341 is arranged at a top end of each fourth rotating slot 34, and an eighth stop edge 342 is arranged at a bottom end of the fourth rotating slot 34; a ninth stop edge 351 is arranged at a top end of each fifth rotating slot 35, and a tenth stop edge 352 is arranged at a bottom end of the fifth rotating slot 35; and an eleventh stop edge 361 is arranged at a top end of each sixth rotating slot 36, and a twelfth stop edge 362 is arranged at a bottom end of the sixth rotating slot 36. Through the above structure, angles of rotation of the respective lamp bodies can be limited, so that the respective lamp bodies can rotate from the folded position to the unfolded position in this manner, without conflicting with each other.

In this embodiment, the pendant lamp main body 1 further includes a rotating shaft 4; the first lamp bodies 21 are rotatably connected to the first connecting portions 11 through the rotating shaft 4; the second lamp bodies 22 are rotatably connected to the second connecting portions 12 through the rotating shaft 4; the third lamp bodies 23 are rotatably connected to the third connecting portions 13 through the rotating shaft 4; the fourth lamp bodies 24 are rotatably connected to the fourth connecting portions 14 through the rotating shaft 4; the fifth lamp bodies 25 are rotatably connected to the fifth connecting portions 15 through the rotating shaft 4; and the sixth lamp bodies 26 are rotatably connected to the sixth connecting portions 16 through the rotating shaft 4. The respective lamp bodies rotate through the rotating shaft 4. The rotating shaft 4 is a simple T-shaped rotating shaft and does not use a complex structure such as a bearing. Instead, the rotating shaft uses a simple clamping slot type structure for rotation, which is simple in structure, saves material, and is convenient to operate.

In this embodiment, the first lamp bodies 21 can rotate around an axis of the rotating shaft 4; when the first lamp bodies 21 rotate to the folded position, the first lamp bodies 21 resist against the first stop edges 311; when the first lamp bodies 21 rotate to the unfolded position, the first lamp bodies 21 resist against the second stop edges 312; the second lamp bodies 22 can rotate around the axis of the rotating shaft 4; when the second lamp bodies 22 rotate to the folded position, the second lamp bodies 22 resist against the third stop edges 321; when the second lamp bodies 22 rotate to the unfolded position, the second lamp bodies 22 resist against the fourth stop edges 322; the third lamp bodies 23 can rotate around the axis of the rotating shaft 4; when the third lamp bodies 23 rotate to the folded position, the third lamp bodies 23 resist against the fifth stop edges 331; when the third lamp bodies 23 rotate to the unfolded position, the third lamp bodies 23 resist against the sixth stop edges 332; the fourth lamp bodies 24 can rotate around the axis of the rotating shaft 4; when the fourth lamp bodies 24 rotate to the folded position, the fourth lamp bodies 24 resist against the seventh stop edges 341; when the fourth lamp bodies 24 rotate to the unfolded position, the fourth lamp bodies 24 resist against the eighth stop edges 342; the fifth lamp bodies 25 can rotate around the axis of the rotating shaft 4; when the fifth lamp bodies 25 rotate to the folded position, the fifth lamp bodies 25 resist against the ninth stop edges 351; when the fifth lamp bodies 25 rotate to the unfolded position, the fifth lamp bodies 25 resist against the tenth stop edges 352; the sixth lamp bodies 26 can rotate around the axis of the rotating shaft 4; when the sixth lamp bodies 26 rotate to the folded position, the sixth lamp bodies 26 resist against the eleventh stop edges 361; and when the sixth lamp bodies 26 rotate to the unfolded position, the sixth lamp bodies 26 resist against the twelfth stop edges 362. The respective stop edges described above are respectively used for serving as upper limits and lower limits of the lamp bodies. The lower limit is used for maintaining the lamp body in an unfolded state, while the upper limit is used for maintaining a vertically upward state when the lamp body rotates to the folded position. In this state, the entire folding pendant lamp occupies the smallest area and saves the most space.

In this embodiment, the first rotating slots 31 and the fourth rotating slots 34 are uniformly distributed on an upper side part of the pendant lamp main body 1; the second rotating slots 32 and the fifth rotating slots 35 are uniformly distributed on a lower side part of the pendant lamp main body 1; and the third rotating slots 33 and the sixth rotating slots 36 are uniformly distributed in a middle part of the pendant lamp main body 1. The rotating slots are uniformly distributed on a surface of the pendant lamp main body 1, so that the lamp bodies can also be uniformly distributed on the surface, which increases the sense of beauty of the folding pendant lamp and ensures that light is uniformly distributed in all directions to effectively provide a lighting function.

In this embodiment, the pendant lamp main body 1 includes an upper housing 101 and a lower housing 102; the upper housing 101 is connected to the lower housing 102; a cross section of the upper housing 101 is semicircular; a cross section of the lower housing 102 is a quadrangle with a wide top and a narrow bottom; an upper side of the lower housing 102 is connected to the upper housing 101; a flat lower surface 1002 is formed on a lower side of the lower housing 102; a battery box 8 is arranged on the lower surface 1002; a battery accommodating cavity 81 is arranged in the battery box 8; and a power switch 82 is arranged on the lower surface 1002. The folding pendant lamp is provided with the upper housing 101 and a lower housing 102. The two housings are assembled and connected for easy production and manufacturing. An interior of each housing is of a hollow structure, so that materials are saved, the weight of the folding pendant lamp is reduced, and transportation is facilitated. In addition to the power switch 82, the folding pendant lamp also has an external control board to control switching of the pendant lamp.

In this embodiment, each first lamp body 21 includes a first lamp post 211 and a lamp base 6; one end of the first lamp post 211 is rotatably connected to the first connecting portion 11 through the rotating shaft 4, and the other end of the first lamp post 211 is connected to the lamp base 6; each second lamp body 22 includes a second lamp post 221 and a lamp base 6; one end of the second lamp post 221 is rotatably connected to the second connecting portion 12 through the rotating shaft 4, and the other end of the second lamp post 221 is connected to the lamp base 6; each third lamp body 23 includeds a third lamp post 231 and a lamp base 6; one end of the third lamp post 231 is rotatably connected to the third connecting portion 13 through the rotating shaft 4, and the other end of the third lamp post 231 is connected to the lamp base 6; each fourth lamp body 24 includes a fourth lamp post 241 and a lamp base 6; one end of the fourth lamp post 241 is rotatably connected to the fourth connecting portion 14 through the rotating shaft 4, and the other end of the fourth lamp post 241 is connected to the lamp base 6; each fifth lamp body 25 includes a fifth lamp post 251 and a lamp base 6; one end of the fifth lamp post 251 is rotatably connected to the fifth connecting portion 15 through the rotating shaft 4, and the other end of the fifth lamp post 251 is connected to the lamp base 6; each sixth lamp body 26 includes a sixth lamp post 261 and a lamp base 6; one end of the sixth lamp post 261 is rotatably connected to the sixth connecting portion 16 through the rotating shaft 4, and the other end of the sixth lamp post 261 is connected to the lamp base 6; the first lamp post 211, the third lamp post 231, and the fifth lamp post 251 have same lengths; the second lamp post 221, the fourth lamp post 241, and the sixth lamp post 261 have same lengths; and the lengths of the second lamp post 221, the fourth lamp post 241, and the sixth lamp post 261 are different from the lengths of the first lamp post 211, the third lamp post 231, and the fifth lamp post 251. Through the above structure, the lamp bodies can rotate around the pendant lamp main body 1. The lamp bodies have two different lengths, so that the lamp bodies in a cross distribution are more beautiful, and the aesthetic fatigue is avoided.

In this embodiment, the first connecting portions 11, the second connecting portions 12, the third connecting portions 13, the fourth connecting portions 14, the fifth connecting portions 15, and the sixth connecting portions 16 are all provided with first wiring holes 91; the rotating shaft 4 is provided with a through hole 92; the first lamp posts 211, the second lamp post 221, the third lamp posts 231, the fourth lamp posts 241, the fifth lamp posts 251, and the sixth lamp posts 261 are all provided with second wiring holes 93; and the first wiring holes 91 are communicated with the second wiring holes 93 through the through hole 92. Through the above structure, a wire can be connected from the battery box 8 to light-emitting parts of the respective lamp bodies.

In this embodiment, a seventh connecting portion 17 is arranged at a top of the pendant lamp main body 1; the pendant lamp main body 1 further includes a hanging chain 171; the hanging chain 171 is composed of several metal rings 1711 that are sequentially interlocked; and one end of the hanging chain 171 is provided with a hook 1712, and the other end of the hanging chain 171 is connected to the seventh connecting portion 17. Through the above structure, the top of the pendant lamp is connected to the hook 1712 through the hanging chain 171 and is then fixed by the hook 1712. Due to the arrangement of the several metal rings 1711 that are interlocked in sequence, the pendant lamp is more aesthetically pleasing, and stable connections can also be provided.

In this embodiment, the upper housing 101 is provided with positioning bolts 1011; the lower housing 102 is provided with positioning slots 1021; and when the positioning bolts 1011 are inserted into the positioning slots 1021, the upper housing 101 is fixedly connected to the lower housing 102. The positioning bolts 1011 and the positioning slots 1021 are used for accurate connection when the upper housing 101 and the lower housing 102 are fixed.

In this embodiment, a lower end of the rotating shaft 4 is provided with a threaded hole 41; one end of each first lamp post 211 connected to the rotating shaft 4 is provided with a positioning hole 42; the first lamp post 211 is detachably connected to the rotating shaft 4 through a screw 411; one end of each second lamp post 221 connected to the rotating shaft 4 is provided with a positioning hole 42; the second lamp post 221 is detachably connected to the rotating shaft 4 through a screw 411; one end of each third lamp post 231 connected to the rotating shaft 4 is provided with a positioning hole 42; the third lamp post 231 is detachably connected to the rotating shaft 4 through a screw 411; one end of each fourth lamp post 241 connected to the rotating shaft 4 is provided with a positioning hole 42; the fourth lamp post 241 is detachably connected to the rotating shaft 4 through a screw 411; one end of each fifth lamp post 251 connected to the rotating shaft 4 is provided with a positioning hole 42; the fifth lamp post 251 is detachably connected to the rotating shaft 4 through a screw 411; one end of each sixth lamp post 261 connected to the rotating shaft 4 is provided with a positioning hole 42; and the sixth lamp post 261 is detachably connected to the rotating shaft 4 through a screw 411. The lamp posts are detachably connected to the rotating shaft 4, so that on the one hand, the lamp posts can be tightly connected to the rotating shaft 4 due to the design of the screws 411; and on the other hand, the rotating shaft 4 can be separated from the lamp posts if necessary, so as to meet different use needs.

In this embodiment, each lamp base 6 includes a filament holder 61 and a luminous filament 62; a cross section of the filament holder 61 is in a cross shape; and the luminous filament 62 is arranged on the filament holder 61. Due to the cross-shaped filament holder 61, more luminous filaments can be distributed, so as to provide a better lighting effect.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

What is claimed is:

1. A folding pendant lamp, comprising:

a pendant lamp main body (1); and a lamp body group (2), wherein the lamp body group (2) is rotatably connected to the pendant lamp main body (1), so that the lamp body group (2) rotates between an unfolded position and a folded position along the pendant lamp main body (1) along a central axis (A1) of the pendant lamp main body (1);

wherein the lamp body group (2) comprises several first lamp bodies (21) and several second lamp bodies (22); the pendant lamp main body (1) is provided with several first connecting portions (11) and several second connecting portions (12); the first lamp bodies (21) are rotatably connected to the first connecting portions (11), and the second lamp bodies (22) are rotatably connected to the second connecting portions (12); a horizontal distance between the first connecting portions (11) and the central axis (A1) is a first distance (D1); a horizontal distance between the second connecting portions (12) and the central axis (A1) is a second distance (D2); and the second distance (D2) is greater than the first distance (D1).

2. The folding pendant lamp according to claim 1, wherein the pendant lamp main body (1) is spherical cap-shaped, and the spherical cap-shaped pendant lamp main body (1) comprises an arc-shaped upper surface (1001) and a flat lower surface (1002).

3. The folding pendant lamp according to claim 1, wherein the lamp body group (2) comprises several fourth lamp bodies (24) and several fifth lamp bodies (25); the pendant lamp main body (1) is provided with several fourth connecting portions (14) and several fifth connecting portions (15); the fourth lamp bodies (24) are rotatably connected to the fourth connecting portions (14), and the fifth lamp bodies (25) are rotatably connected to the fifth connecting portions (15); a horizontal distance between the fourth connecting portions (14) and the central axis (A1) is a fourth distance (D4); a horizontal distance between the fifth connecting portions (15) and the central axis (A1) is a fifth distance; and the fifth distance (D5) is greater than the fourth distance (D4).

4. The folding pendant lamp according to claim 3, wherein the lamp body group (2) comprises several third lamp bodies (23) and several sixth lamp bodies (26); the pendant lamp main body (1) is provided with several third connecting portions (13) and several sixth connecting portions (16); the third lamp bodies (23) are rotatably connected to the third connecting portions (13), and the sixth lamp bodies (26) are rotatably connected to the sixth connecting portions (16); a horizontal distance between the third connecting portions (13) and the central axis (A1) is a third distance (D3); a horizontal distance between the sixth connecting portions (16) and the central axis (A1) is a sixth distance (D6); and the third distance (D3) is equal to the sixth distance (D6).

5. The folding pendant lamp according to claim 4, wherein the first connecting portions (11) and the second connecting portions (12) are located in the same vertical plane (P3); the fourth connecting portions (14) and the fifth connecting portions (15) are located in the same vertical plane (P4); the first connecting portions (11) and the fourth connecting portions (14) are located in the same horizontal plane (P1); and the second connecting portions (12) and the fifth connecting portions (15) are located in the same horizontal plane (P2).

6. The folding pendant lamp according to claim 4, wherein the first lamp bodies (21) and the second lamp bodies (22) are located in the same vertical plane (P3); the fourth lamp bodies (24) and the fifth lamp bodies (25) are located in the same vertical plane (P4).

7. The folding pendant lamp according to claim 4, wherein the pendant lamp main body (1) is provided with several first rotating slots (31), second rotating slots (32), third rotating slots (33), fourth rotating slots (34), fifth rotating slots (35), and sixth rotating slots (36) along the arc-shaped upper surface (1001); the first connecting portions (11) are arranged in the first rotating slots (31); the second connecting portions (12) are arranged in the second rotating slots (32); the third connecting portions (13) are arranged in the third rotating slots (33); the fourth connecting portions (14) are arranged in the fourth rotating slots (34); the fifth connecting portions (15) are arranged in the fifth rotating slots (35); the sixth connecting portions (16) are arranged in the sixth rotating slots (36); the first rotating slots (31) and the second rotating slots (32) are located in the same vertical plane (P3); the fourth rotating slots (34) and the fifth rotating slots (35) are located in the same vertical plane (P4); the first rotating slots (31) and the fourth rotating slots (34) are located in the same horizontal plane (P1); and the second rotating slots (32) and the fifth rotating slots (35) are located in the same horizontal plane (P2).

8. The folding pendant lamp according to claim 7, wherein a first stop edge (311) is arranged at a top end of each first rotating slot (31), and a second stop edge (312) is arranged at a bottom end of the first rotating slot (31); a third stop edge (321) is arranged at a top end of each second rotating slot (32), and a fourth stop edge (322) is arranged at a bottom end of the second rotating slot (32); a fifth stop edge (331) is arranged at a top end of each third rotating slot (33), and a sixth stop edge (332) is arranged at a bottom end of the third rotating slot (33); a seventh stop edge (341) is arranged at a top end of each fourth rotating slot (34), and an eighth stop edge (342) is arranged at a bottom end of the fourth rotating slot (34); a ninth stop edge (351) is arranged at a top end of each fifth rotating slot (35), and a tenth stop edge (352) is arranged at a bottom end of the fifth rotating slot (35); and an eleventh stop edge (361) is arranged at a top end of each sixth rotating slot (36), and a twelfth stop edge (362) is arranged at a bottom end of the sixth rotating slot (36).

9. The folding pendant lamp according to claim 7, wherein the pendant lamp main body (1) further comprises a rotating shaft (4); the first lamp bodies (21) are rotatably connected to the first connecting portions (11) through the rotating shaft (4); the second lamp bodies (22) are rotatably connected to the second connecting portions (12) through the rotating shaft (4); the third lamp bodies (23) are rotatably connected to the third connecting portions (13) through the rotating shaft (4); the fourth lamp bodies (24) are rotatably connected to the fourth connecting portions (14) through the rotating shaft (4); the fifth lamp bodies (25) are rotatably connected to the fifth connecting portions (15) through the rotating shaft (4); and the sixth lamp bodies (26) are rotatably connected to the sixth connecting portions (16) through the rotating shaft (4).

10. The folding pendant lamp according to claim 9, wherein the first lamp bodies (21) rotate around an axis of the rotating shaft (4); when the first lamp bodies (21) rotate to the folded position, the first lamp bodies (21) resist against the first stop edges (311); when the first lamp bodies (21) rotate to the unfolded position, the first lamp bodies (21) resist against the second stop edges (312); the second lamp bodies (22) rotate around the rotating shaft (4); when the second lamp bodies (22) rotate to the folded position, the second lamp bodies (22) resist against the third stop edges (321); when the second lamp bodies (22) rotate to the unfolded position, the second lamp bodies (22) resist against the fourth stop edges (322); the third lamp bodies (23) rotate around the axis of the rotating shaft (4); when the third lamp bodies (23) rotate to the folded position, the third lamp bodies (23) resist against the fifth stop edges (331); when the third lamp bodies (23) rotate to the unfolded position, the third lamp bodies (23) resist against the sixth stop edges (332); the fourth lamp bodies (24) rotate around the axis of the rotating shaft (4); when the fourth lamp bodies (24) rotate to the folded position, the fourth lamp bodies (24) resist against the seventh stop edges (341); when the fourth lamp bodies (24) rotate to the unfolded position, the fourth lamp bodies (24) resist against the eighth stop edges (342); the fifth lamp bodies (25) rotate around the axis of the rotating shaft (4); when the fifth lamp bodies (25) rotate to the folded position, the fifth lamp bodies (25) resist against the ninth stop edges (351); when the fifth lamp bodies (25) rotate to the unfolded position, the fifth lamp bodies (25) resist against the tenth stop edges (352); the sixth lamp bodies (26) rotate around the axis of the rotating shaft (4); when the sixth lamp bodies (26) rotate to the folded position, the sixth lamp bodies (26) resist against the eleventh stop edges (361); and when the sixth lamp bodies (26) rotate to the unfolded position, the sixth lamp bodies (26) resist against the twelfth stop edges (362).

11. The folding pendant lamp according to claim 9, wherein the first rotating slots (31) and the fourth rotating slots (34) are uniformly distributed on an upper side part of the pendant lamp main body (1); the second rotating slots (32) and the fifth rotating slots (35) are uniformly distributed on a lower side part of the pendant lamp main body (1); and the third rotating slots (33) and the sixth rotating slots (36) are uniformly distributed in a middle part of the pendant lamp main body (1).

12. The folding pendant lamp according to claim 2, wherein the pendant lamp main body (1) comprises an upper housing (101) and a lower housing (102); the upper housing (101) is connected to the lower housing (102); a cross section of the upper housing (101) is semicircular; a cross section of the lower housing (102) is a quadrangle with a wide top and a narrow bottom; an upper side of the lower housing (102) is connected to the upper housing (101); a flat lower surface (1002) is formed on a lower side of the lower housing (102); a battery box (8) is arranged on the lower surface (1002); a battery accommodating cavity (81) is arranged in the battery box (8); and a power switch (82) is arranged on the lower surface (1002).

13. The folding pendant lamp according to claim 9, wherein each first lamp body (21) comprises a first lamp post (211) and a lamp base (6); one end of the first lamp post (211) is rotatably connected to the first connecting portion through the rotating shaft (4), and the other end of the first lamp post (211) is connected to the lamp base (6); each second lamp body (22) comprises a second lamp post (221) and a lamp base (6); one end of the second lamp post (221) is rotatably connected to the second connecting portion (12) through the rotating shaft (4), and the other end of the second lamp post (221) is connected to the lamp base (6); each third lamp body (23) comprises a third lamp post (231) and a lamp base (6); one end of the third lamp post (231) is rotatably connected to the third connecting portion (13) through the rotating shaft (4), and the other end of the third lamp post (231) is connected to the lamp base (6); each fourth lamp body (24) comprises a fourth lamp post (241) and a lamp base (6); one end of the fourth lamp post (241) is rotatably connected to the fourth connecting portion (14) through the rotating shaft (4), and the other end of the fourth lamp post (241) is connected to the lamp base (6); each fifth lamp body (25) comprises a fifth lamp post (251) and a lamp base (6); one end of the fifth lamp post (251) is rotatably connected to the fifth connecting portion (15) through the rotating shaft (4), and the other end of the fifth lamp post (251) is connected to the lamp base (6); each sixth lamp body (26) comprises a sixth lamp post (261) and a lamp base (6); one end of the sixth lamp post (261) is rotatably connected to the sixth connecting portion (16) through the rotating shaft (4), and the other end of the sixth lamp post (261) is connected to the lamp base (6); the first lamp post (211), the third lamp post (231), and the fifth lamp post (251) have same lengths; the second lamp post (221), the fourth lamp post (241), and the sixth lamp post (261) have same lengths; and the lengths of the second lamp post (221), the fourth lamp post (241), and the sixth lamp post (261) are different from the lengths of the first lamp post (211), the third lamp post (231), and the fifth lamp post (251).

14. The folding pendant lamp according to claim 13, wherein the first connecting portions (11), the second connecting portions (12), the third connecting portions (13), the fourth connecting portions (14), the fifth connecting portions (15), and the sixth connecting portions (16) are all provided with first wiring holes (91); the rotating shaft (4) is provided with a through hole (92); the first lamp posts (211), the second lamp post (221), the third lamp posts (231), the fourth lamp posts (241), the fifth lamp posts (251), and the sixth lamp posts (261) are all provided with second wiring holes (92); and the first wiring holes are communicated with the second wiring holes (93) through the through hole (92).

15. A folding pendant lamp, comprising:

a pendant lamp main body (1); and a lamp body group (2), wherein the lamp body group is rotatably connected to the pendant lamp main body (1), so that the lamp body group (2) rotates between an unfolded position and a folded position along the pendant lamp main body (1);

wherein a seventh connecting portion (17) is arranged at a top of the pendant lamp main body (1); the pendant lamp main body (1) further comprises a hanging chain (171); the hanging chain (171) is composed of several metal rings (1711) that are sequentially interlocked; and one end of the hanging chain (171) is provided with a hook (1712), and the other end of the hanging chain (171) is connected to the seventh connecting portion (17).

16. The folding pendant lamp according to claim 12, wherein the upper housing (101) is provided with a positioning bolt (1011); the lower housing (102) is provided with a positioning slot (1021); and when the positioning bolt (1011) is inserted into the positioning slot (1021), the upper housing (101) is fixedly connected to the lower housing (102).

17. The folding pendant lamp according to claim 13, wherein a lower end of the rotating shaft (4) is provided with a threaded hole (41); one end of each first lamp post (211)

connected to the rotating shaft (4) is provided with a positioning hole (42); the first lamp post (211) is detachably connected to the rotating shaft (4) through a screw (411); one end of each second lamp post (221) connected to the rotating shaft (4) is provided with a positioning hole (42); the second lamp post (221) is detachably connected to the rotating shaft (4) through a screw (411); one end of each third lamp post (231) connected to the rotating shaft (4) is provided with a positioning hole (42); the third lamp post (231) is detachably connected to the rotating shaft (4) through a screw (411); one end of each fourth lamp post (241) connected to the rotating shaft (4) is provided with a positioning hole (42); the fourth lamp post (241) is detachably connected to the rotating shaft (4) through a screw (411); one end of each fifth lamp post (251) connected to the rotating shaft (251) is provided with a positioning hole (42); the fifth lamp post (251) is detachably connected to the rotating shaft (4) through a screw (411); one end of each sixth lamp post (261) connected to the rotating shaft (4) is provided with a positioning hole (42); and the sixth lamp post (261) is detachably connected to the rotating shaft (4) through a screw (411).

18. The folding pendant lamp according to claim 13, wherein each lamp base (6) comprises a filament holder (61) and a luminous filament (62); and the luminous filament (61) is arranged on the filament holder (61).

* * * * *